United States Patent [19]

Alvenes

[11] Patent Number: 6,070,422
[45] Date of Patent: Jun. 6, 2000

[54] TRANSPORT HOOD/COVER AND APPLICATION THEREOF

[75] Inventor: Per Morten Alvenes, Stabekk, Norway

[73] Assignee: Supertainer International AS, Rud, Norway

[21] Appl. No.: 09/029,256

[22] PCT Filed: Sep. 7, 1995

[86] PCT No.: PCT/NO95/00153

§ 371 Date: Apr. 23, 1998

§ 102(e) Date: Apr. 23, 1998

[87] PCT Pub. No.: WO97/09198

PCT Pub. Date: Mar. 13, 1997

[51] Int. Cl.[7] .................................................. F25D 23/12
[52] U.S. Cl. ............................................. 62/261; 165/46
[58] Field of Search ..................... 62/261, 530, 259.3; 165/46

[56] References Cited

U.S. PATENT DOCUMENTS

| | | | |
|---|---|---|---|
| 1,670,658 | 5/1928 | Garbutt | 62/261 |
| 2,093,834 | 9/1937 | Gaugler | 62/261 |
| 2,110,022 | 3/1938 | Kliesrath | 62/261 |
| 2,562,121 | 7/1951 | Poux | 165/46 |
| 3,834,292 | 9/1974 | Sund | 62/261 |
| 4,132,262 | 1/1979 | Wibell | 62/261 |
| 4,867,230 | 9/1989 | Voss | 62/261 |
| 4,959,877 | 10/1990 | Covil | 62/261 |
| 5,086,629 | 2/1992 | Dibrell | 62/530 |
| 5,165,127 | 11/1992 | Nicholson | 62/261 |
| 5,304,216 | 4/1994 | Wallace | 62/530 |
| 5,570,588 | 11/1996 | Lowe | 62/530 |

*Primary Examiner*—William E. Tapolcal
*Attorney, Agent, or Firm*—Dennison, Scheiner, Schultz & Wakeman

[57] ABSTRACT

A transport cover or tarpaulin includes at least one sheet of a flexible insulated material, including chambers for a coolant and additionally including channels constructed and arranged for filling with a gas. The outer surface of the cover may be covered with a heat-reflecting material.

8 Claims, 1 Drawing Sheet

TRANSPORT HOOD/COVER AND APPLICATION THEREOF

BACKGROUND OF THE INVENTION

The present application relates to the a transport cover/tarpaulin and use thereof, especially for goods which during transport require refrigeration, freezing or segregation such as, e.g., foodstuffs and certain types of chemicals and hazardous goods.

During transport of the aforementioned product groups it is of importance that an even and/or low temperature is maintained throughout the entire duration of the transport.

One of the foodstuffs which is transported within, and exported from, Norway in large quantities is fresh and frozen fish. Fish is also transported in large quantities to remote markets such as, e.g., Japan. The invention will be described below on the basis of this transport of fish. However, it must be stressed that this is merely intended to serve as an example and that the transport cover according to the invention is equally suitable for all types of goods as mentioned above.

It is desirable, of course, that it should also be possible to transport fish to remote markets without any reduction in quality. However, on account of the fish being reloaded several times considerable problems are involved here.

Fish is packed for transport in cases of cardboard or polystyrene, and these cases are loaded on pallets. The fish is then transported in thermotrucks to an air terminal where it is loaded into the cargo hold of a plane.

As mentioned above, it is desirable for the fish to be kept in an unbroken cold storage chain throughout the journey from the producer to the retailer.

Critical points in this transport chain are those where the refrigerated goods and frozen goods pass from controlled refrigerated/deep-freeze points to new transport or storage places, e.g.. from a refrigerated/freezer terminal to the cargo hold of a plane, and where the goods may remain on the runway, at worst for up to several hours. The temperature on the runway may be very high.

Previously, in some cases air freight containers of aluminium or Plexiglas have been used. The problem with these, however, is that large volumes of empties must be transported back to their place of departure.

SUMMARY OF THE INVENTION

By means of the present invention, a transport cover or tarpaulin is provided, consisting of one or more flexible sheets of insulating material, where the outer surface may have a reflective foil or other heat-reflecting material, where the sheet(s) of insulating material have channels or chambers for a coolant, and in the case of frozen transport for a freezant, characterised in that the sheet(s) of insulating material in addition have channels or chambers which are filled with gas, e.g., air or nitrogen.

The channels or chambers which are intended to be filled with, e.g., gas, are preferably provided with a pressure control valve.

The transport cover/tarpaulin according to the invention may be designed as a complete cover of the desired size. Alternatively, the tarpaulin may be closed around the load by means of a closing device of any type whatever. One example of a simple closing device which may be used in the present case is a Velcro fastening. The height and the diagonal of the transport cover are adjusted according to the desired type of plane/air freight pallet and height between decks.

The sheet or sheets of insulating material in the transport cover/tarpaulin according to the invention may in principle consist of a number of, preferably soft, materials. In practice, soft plastics, and for special uses also the more temperature resistant versions of this type of material, have shown themselves to be well-suited.

Similarly, a number of materials may be used as the coolant. However, "Gel-ice" has proven to be a favourable alternative, both with a view to availability and price.

As optional reflective foil on the outside of the sheet of insulating material, aluminium foil is a preferred material. It would be of advantage to provide clear plastic pockets on the outside of the foil for the insertion of dispatch documents, etc.

The invention further comprises the use of the above-mentioned transport cover/tarpaulin as outer packaging when transporting goods which during transport require refrigeration, freezing or segregation such as, e.g., foodstuffs and certain types of chemicals and hazardous goods.

When the transport cover is filled with air, the cover will furthermore support the load and fit tightly around the load to maintain the cold, the air chamber functioning as a "vacuum flask" on the outside of the cooling elements and the load.

The load stands on a typical air freight pallet with an insulating underlay and is completely covered by the cover. The whole air freight pallet is transported in a thermotruck. The temperature is set at −10 to −15° C. During transport, the cooler element insert is frozen efficiently and rapidly as the air chambers are not filled. On arrival at the airport, the channels are inflated and they function as extra insulation on the outside of the active refrigeration unit at the airport and during the journey. When used for frozen transport, a freezant such as dry ice bars or blocks are put in the chambers in the cover before the gas channels are filled. The requirement for underlay insulation will be greater than it is in the case of refrigerated transport in order to prevent loss of cold through the bottom.

On arrival at the recipient destination, the air is released and the cover is folded.

A second major advantage achieved by means of the transport cover/tarpaulin according to the invention is that the return logistics for the packaging are rendered far more favourable. Instead of transporting considerable volumes of empties back to their place of departure, the cover according to the invention can be transported back in a folded state. A considerable saving is thereby achieved in terms of both weight and volume in comparison to today's systems.

A second alternative is that the cover during the journey home can function as a regular tarpaulin.

As mentioned by way of introduction, the transport of fish is an area where the transport cover/tarpaulin according to the invention would be of great use. One or two other advantageous examples of the use of the present invention are given below.

Fruit and vegetables are transported in great quantities by plane, and here too the cover/tarpaulin according to the invention with its active coolant and insulating properties will increase the certainty of quality maintenance and thereby reduce loss. Also, during the transport of fruit and vegetables the products are often reloaded from one plane to another, and this happens in airports which seldom have the facilities for or possibilities of maintaining an unbroken cold storage chain. By means of the present invention, this need for an unbroken cold storage chain is met and the transported goods are able to fulfil very high quality requirements.

A second relevant product group includes chemicals and inflammable goods which today are required to be transported under very restricted conditions. The transport cover/tarpaulin according to the invention will make it possible to transport these goods in the cargo hold on board passenger planes or on freight planes in larger amounts than today. This is so because the transport cover/tarpaulin eliminates the dangers which present themselves as obstacles to this transport today.

By using an aramide material, e.g., Kevlar, which has been PBI-treated, as a layer in the cover, the protection against generation of heat or fire in the plane prevents the content inside the cover from being ignited owing to the special properties of the Kevlar layer.

DESCRIPTION OF THE PREFERRED EMBODIMENTS

Figure 1:
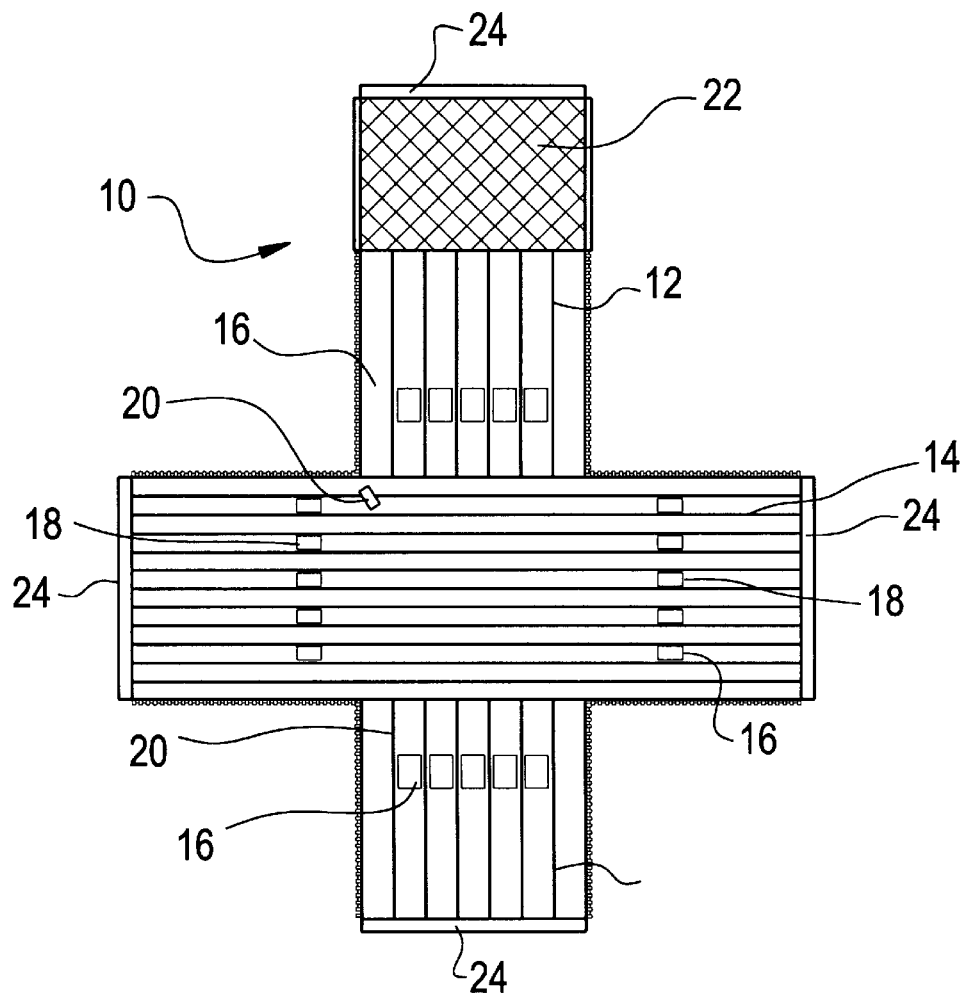
FIG. 1 is a bottom plan view of a transport cover according to the invention.

As shown in FIG. 1, a transport cover 10 comprises a first layer of material 12 and a second layer of material 14 in a partially superposed relationship. Both layers include chambers 16 for receipt of dry ice or gel ice for cooling, and a plurality of internal channels 18 for receipt of a gas. A pressure control valve 20 is provided in each layer for filling with the gas. Further, layer 12 is provided with a covering of a reflective material 22.

A closing tape 24 is provided at the end of each layer.

Figure 2:
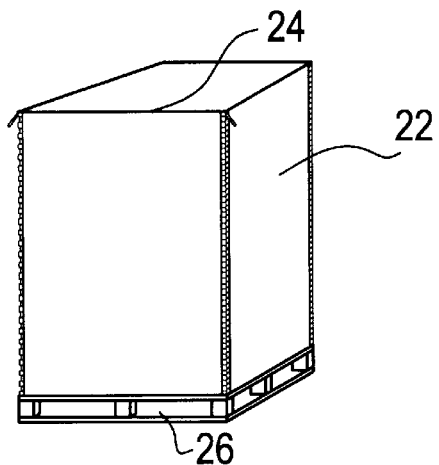
FIG. 2 is a side view of the transport cover in use wrapping a material for transport.

FIG. 2 shows the transport cover 10 in use on a pallet 26 wrapping a material which is encased within the transport cover and therefore not shown.

What is claimed is:

1. A transport cover comprising at least one sheet of a flexible insulating material, said at least one sheet comprising chambers for a coolant, and additionally comprising channels constructed and arranged for filling with a gas and a pressure control valve for filling the channels with the gas.

2. A transport cover according to claim 1, having an outer surface covered with a heat-reflecting material.

3. A transport cover according to claim 2, wherein the heat-reflecting material is a metallic foil.

4. A transport cover according to claim 1, wherein the chambers are constructed and arranged for receiving a freezant.

5. A transport cover according to claim 1, further comprising means for closing the cover around an object to be covered.

6. Method for transporting a material requiring cooling comprising wrapping the material with a transport cover comprising at least one sheet of a flexible insulating material, said at least one sheet comprising chambers for a coolant, and additionally comprising channels constructed and arranged for filling with a gas and a pressure control valve for filling the channels with the gas, and filling said chambers with a coolant and said channels with a gas through the pressure control valve.

7. A method according to claim 6, wherein the gas is air or nitrogen.

8. A method according to claim 6, wherein the coolant is a gel.

* * * * *